Nov. 6, 1934.                E. O. ZANDER                1,979,432
                              WEED CUTTER
                          Filed Jan. 15, 1934
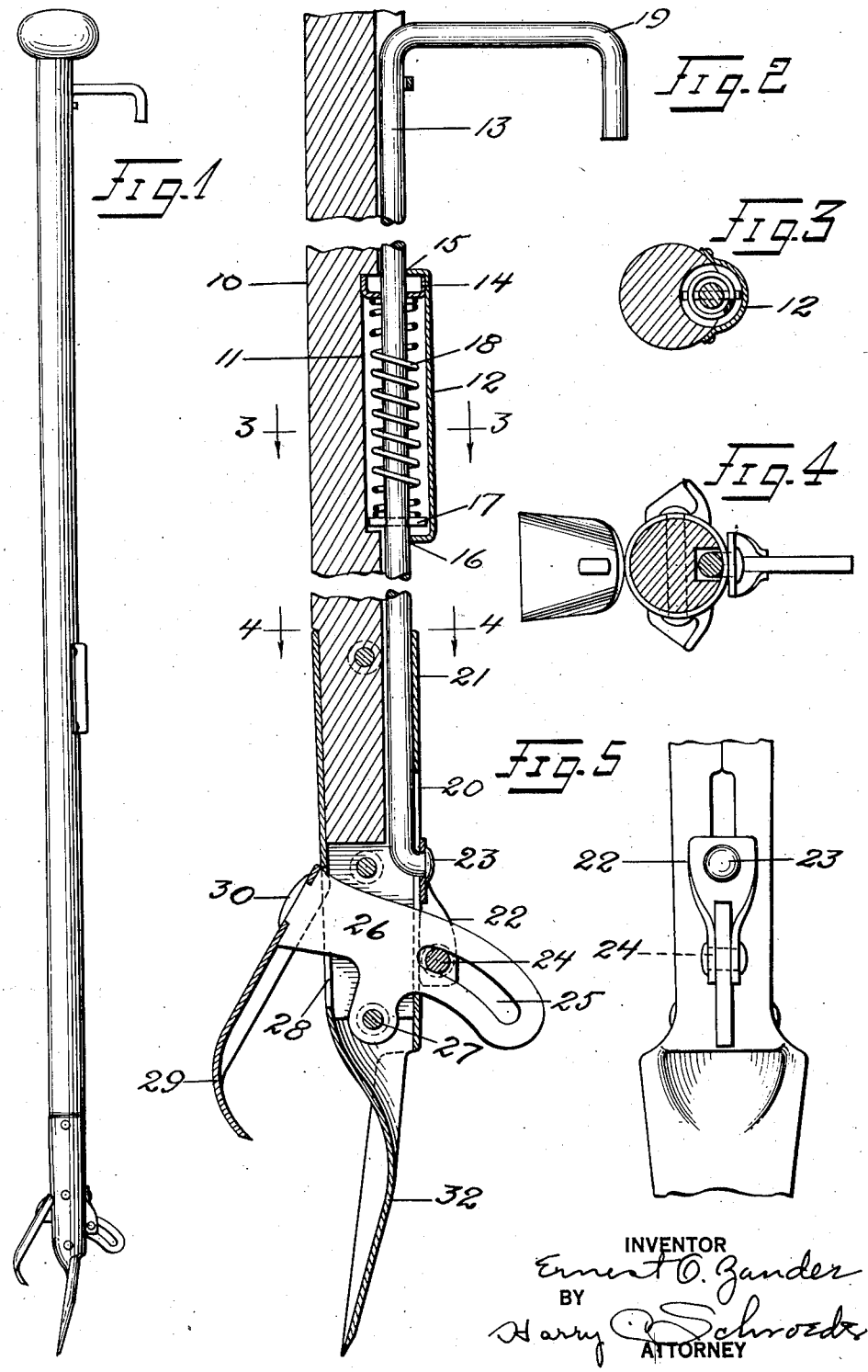
INVENTOR
Ernest O. Zander
BY
Harry Schroeder
ATTORNEY Patented Nov. 6, 1934

1,979,432

UNITED STATES PATENT OFFICE 1,979,432

WEED CUTTER

Ernest O. Zander, Oakland, Calif.

Application January 15, 1934, Serial No. 706,675

4 Claims. (Cl. 55—148)

This invention is for a weed cutter, the principal object of which is to provide a simple, inexpensive, and effective device for cutting weeds off at the approximate level of the ground in which the weed is rooted.

Other objects of the invention will appear as the specification thereof proceeds.

The invention will be hereinafter fully set forth and particularly pointed out in the claims.

In the accompanying drawing:

Figure 1 is a side elevation of the weed cutter.

Figure 2 is a sectional elevation of the weed cutter showing the position of the spring and spade and weed cutting element.

Figure 3 is a top plan view of the weed cutter taken on lines 3—3 of Figure 2, looking in the direction of the arrows.

Figure 4 is a top plan view of the weed cutter taken on lines 4—4 of Figure 2, looking in the direction of the arrows.

Figure 5 is a back view of the weed cutter with a portion of the handle and the spade broken away.

Like reference characters indicate like parts of the invention throughout the several views of the drawing, in which reference character 10 indicates a handle preferably round in cross section and is provided with a recess 11 intermediate its ends for cooperation with plate 12, for forming a housing having apertures through its respective ends, through which apertures rod 13 has reciprocal movement. Cup-shaped washer 14 surrounds the operating rod 13 and abuts against the upper end wall of the housing through which washer and apertures 15 and 16 in the ends of the housing, the operating rod 13 has free reciprocal movement. Operating rod 13 is provided with pin 17 which passes therethrough with its ends projecting beyond the sides of the rod, thus forming a rest for the lower end of spring 18, which surrounds the operating rod for compressing the spring between the cup-shaped washer and the pin. Operating rod 13 is provided at its upper end with hand grip 19 and is bent outwardly at its lower end through slot 20 of sleeve 21, affixed to the handle 10 in any suitable manner and adjacent the lower end thereof. The lower end of operating rod 13 is affixed to yoke 22 as at 23. Yoke 22 is provided with pin 24 passing therethrough for reciprocal movement in arcuate slot 25 of bell-crank 26 which is pivotally related to the handle 10 at a point adjacent the lower end thereof as at 27. Sleeve 21 is provided with slot 28 diametrically opposite slot 20, thus providing for the movement of the respective ends of the bell-crank when rocked on its pivot 27 by the upward movement of operating rod 13 against the action of spring 18. Bell-crank 26 carries downwardly extending detachable cutting blade 29, which curves inwardly toward space 32 at its lower portion and may be secured to the bell-crank by machine screw 30 or in any suitable manner. Sleeve 21 terminates in spade 32 at its lower end, which spade is arcuately formed in cross-section and has it longitudinal edges tapered inwardly to its longitudinal median line forming a point for easy insertion into the ground adjacent a weed to be cut for securing the cutting blade in fixed position with relation to a weed for severing the top from the root when the operating rod 13 is drawn upwardly against the action of spring 18, rocking the bell-crank 26 on its pivot 27, forcing the cutting blade toward the spade 32, thereby cutting the top of the weed off from its root at the approximate surface of the ground, the weed being between the cutting blade and the spade.

Having thus explained the nature of the invention, and described an operative manner of constructing and using the same, although not attempting to set forth all the forms in which it may be made, or all the forms of its use, what is claimed is:

1. A weed cutter comprising a handle, a housing formed on the handle, a spring-tensioned operating rod capable of reciprocable movement through the housing, a yoke slidably related to the handle, and affixed to the rod, a bell-crank pivotally related to the handle and pivotal by the yoke, a cutting blade carried by the bell-crank and means for securing the cutting blade in cutting position with relation to a weed.

2. A weed cutter comprising a handle, a housing formed on the handle, a spring-tensioned operating rod capable of reciprocable movement through the housing, a slotted bell-crank pivotally related to the handle, a cutting blade carried by one end of the bell-crank and a yoke slidably related to the handle and affixed to the operating rod, a pin carried by the yoke and passing through the slot of the bell-crank, and means for securing the cutting blade in cutting position with relation to a weed.

3. A weed cutter comprising a handle, a housing formed on the handle, a spring-tensioned operating rod capable of reciprocable movement through the housing, a diametrically opposite slotted sleeve affixed to the handle and terminating in a spade at its lower end, an arcuately slotted bell-crank pivotally mounted in the slots, a cutting blade carried by the bell-crank, a yoke slidably related to the sleeve and affixed to the operating rod, and a pin carried by the yoke and passing through the arcuate slot.

4. A weed cutter comprising a slotted handle, a plate spanning the slot forming a housing, having apertures through its ends, an operating rod extending through the apertures, a pin passing through the rod adjacent the lower ends of the housing, a washer surrounding the rod at a point spaced from the pin, a spring surrounding the rod and contacting with the pin and the washer at its respective ends, a sleeve having slots on its diametrically opposite sides affixed to the lower end of the handle and terminating in a spade at its lower end, a yoke slidably related to the sleeve and affixed to the lower end of the operating rod, a bell-crank pivotally mounted in the slots of the sleeve with its ends extending beyond the opposite faces thereof, one of its ends having an arcuate slot therethrough, the other of its ends terminating in a detachable cutting blade and a pin carried by the yoke and extending through the arcuate slot of the bell-crank.

ERNEST O. ZANDER.